US012619710B2

(12) United States Patent
Dubrovsky et al.

(10) Patent No.: US 12,619,710 B2
(45) Date of Patent: May 5, 2026

(54) SECURING SOFTWARE ARCHITECTURES WITH THREAT MODELS

(71) Applicant: Dell Products L.P., Round Rock, TX (US)

(72) Inventors: Igor Dubrovsky, Beer Sheva (IL); Boris Shpilyuck, Ashdod (IL); Maxim Balin, Gan-Yavne (IL); Nisan Haimov, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 393 days.

(21) Appl. No.: 18/456,900

(22) Filed: Aug. 28, 2023

(65) Prior Publication Data

US 2025/0077644 A1     Mar. 6, 2025

(51) Int. Cl.
*G06F 21/57*          (2013.01)
*G06F 21/53*          (2013.01)
*G06F 21/56*          (2013.01)

(52) U.S. Cl.
CPC ............ *G06F 21/53* (2013.01); *G06F 21/562* (2013.01); *G06F 21/577* (2013.01)

(58) Field of Classification Search
CPC ....... G06F 21/53; G06F 21/562; G06F 21/577
See application file for complete search history.

(56) References Cited

U.S. PATENT DOCUMENTS

| | | | | |
|---|---|---|---|---|
| 12,141,291 B1 * | 11/2024 | Rappaport | ................. | G06F 8/77 |
| 2007/0162890 A1 * | 7/2007 | Meier | ................... | G06F 21/577 |
| | | | | 717/100 |
| 2009/0083695 A1 * | 3/2009 | Mir | ........................ | G06Q 10/06 |
| | | | | 717/104 |
| 2016/0092185 A1 * | 3/2016 | Botti | .................. | G06Q 10/0635 |
| | | | | 717/103 |
| 2017/0098072 A1 | 4/2017 | Stopel | | |
| 2019/0205542 A1 * | 7/2019 | Kao | ......................... | G06F 8/10 |
| 2020/0257512 A1 | 8/2020 | Iyengar Gorur Krishna | | |
| 2021/0004387 A1 | 1/2021 | Potturu | | |
| 2021/0157927 A1 * | 5/2021 | Beddus | ..................... | G06F 8/61 |

* cited by examiner

*Primary Examiner* — Trong H Nguyen
(74) *Attorney, Agent, or Firm* — WOMBLE BOND DICKINSON (US) LLP

(57)          ABSTRACT

Methods and systems for securing software architectures are disclosed. The software architectures may be secured through the implementation of threat models. The threat models may include design threat models that indicate vulnerabilities that software based on an architecture may exhibit, and build threat models that indicate vulnerabilities of implementation of the software based on the architecture may exhibit. The threat models may be used to select where and how to deploy software to limit exploitable vulnerabilities to be within acceptable levels.

20 Claims, 8 Drawing Sheets

SECURING SOFTWARE ARCHITECTURES WITH THREAT MODELS

FIELD

Embodiments disclosed herein relate generally to threat modeling. More particularly, embodiments disclosed herein relate to securing software architectures and implementations through threat models.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
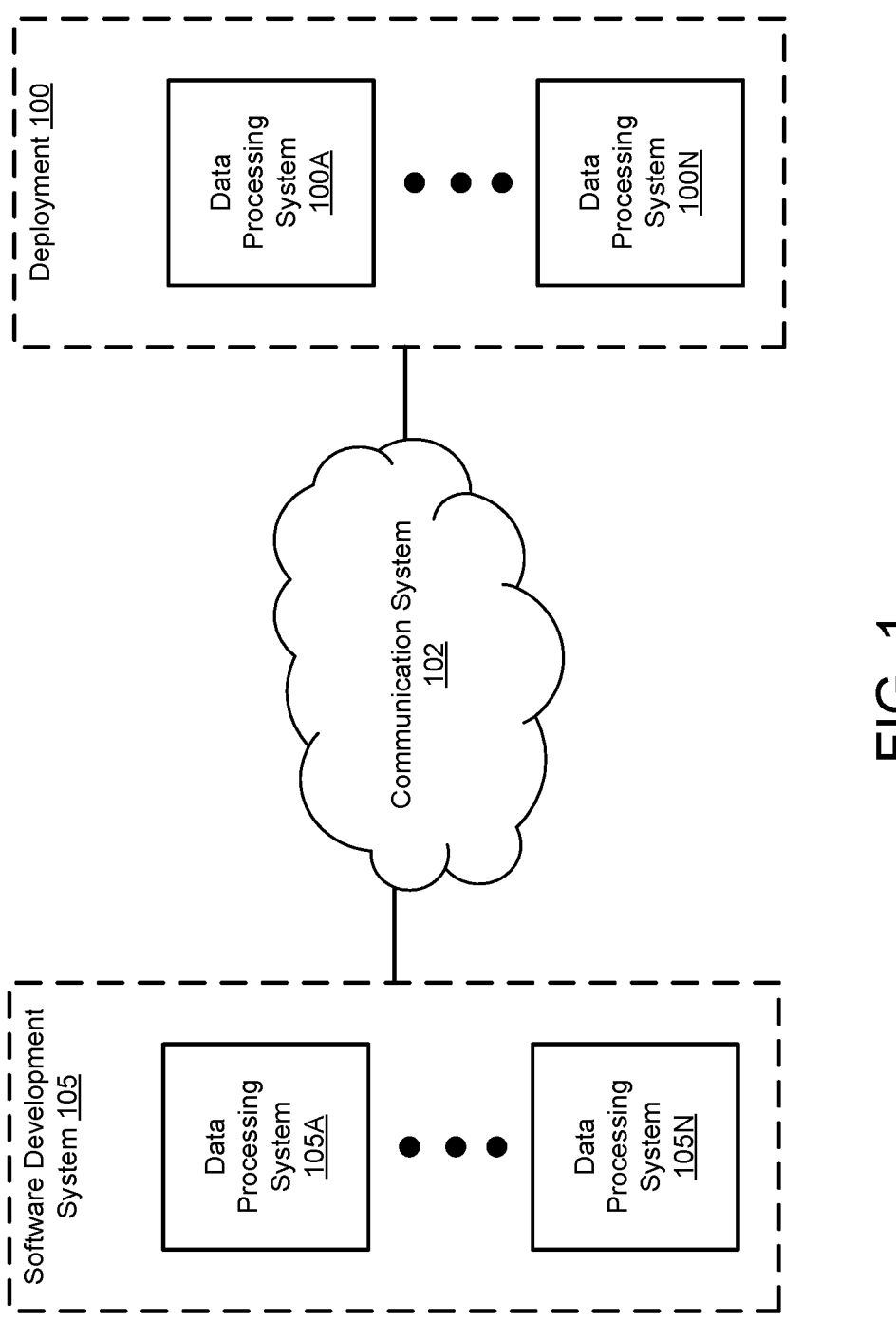
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for securing software to limit exploitation of vulnerabilities. To limit the exploitation of the vulnerabilities, a threat model based on an architecture and implementation of a software may be obtained. The threat models may be based on deviations of the architecture and implementation from security standards for the software.

The threat models may be used to qualify the software for various uses. For example, different entities may be willing to accept lesser or greater numbers of exploitable vulnerabilities in deployed software.

Additionally, the threat models may be used to limit the extent to which vulnerabilities may be exploited in deployed instances of software. For example, the threat models may be used to select where and how to deploy the software to limit the ability of vulnerabilities to be exploited. By doing so, software that may not otherwise meet security standards for an organization may be placed into acceptable condition by reduce the ability of the vulnerabilities from being exploited.

In an embodiment, a method securing software architectures is provided. The method may include (i) identifying software for deployment to a data processing system, (ii) based on the identifying of the software: (a) identifying a final threat model for the software, the final threat model being based on an architecture for the software and an implementation of the software; (b) defining an environment to which the software will be deployed using the final threat model to obtain an environment definition; and (c) deploying the software to an instance of the environment hosted by the data processing system using the environment definition.

The method may further include, prior to identifying the software for the deployment to the data processing system: (i) obtaining the architecture for the software; (ii) analyzing the architecture to obtain a first quantification regarding first vulnerabilities presented by the architecture using at least one security standard; and (iii) obtaining a design threat model for the architecture using the first vulnerabilities, in a first instance of analyzing where the first quantification is in a first acceptable range.

The method may further include, prior to identifying the software for the deployment to the data processing system, and after obtaining the design threat model: (i) obtaining the implementation of the software; (ii) analyzing the implementation of the software to obtain a second quantification regarding second vulnerabilities presented by the implementation of the software; (iii) obtaining a build threat model for the implementation of the software using the second vulnerabilities; (iv) analyzing the design threat model and the build threat model to obtain a third quantification regarding a difference between the first vulnerabilities and the second vulnerabilities using the first quantification and the second quantification; (v) obtaining the final threat model using the design threat model and the build thread model, in a first instance of the analyzing of the design threat model and the build threat model where the third quantification is in a third acceptable range; and (vi) initiating revision of the architecture and/or the implementation, in the second instance of the analyzing of the design threat model and the build threat model where the third quantification is outside of the third acceptable range.

Obtaining the design threat model for the architecture may include: (i) identifying a first deviation of the architecture from the at least one security standard; (ii) identifying at least one vulnerability associated with the first deviation; and (iii) adding the at least one vulnerability associated with the first deviation to the design threat model.

Obtaining the build threat model for the implementation of the software may include: (i) identifying a second deviation of the implementation from the at least one security standard; (ii) identifying at least one vulnerability associated with the second deviation; and (iii) adding the at least one vulnerability associated with the second deviation to the build threat model.

Analyzing the design threat model and the build threat model to obtain a third quantification regarding the difference between the first vulnerabilities and the second vulnerabilities may include: (i) enumerating the first vulnerabilities specified by the design threat model to obtain a first enumeration of vulnerabilities; (ii) enumerating the second vulnerabilities specified by the implementation threat model to obtain a second enumeration of the vulnerabilities; (iii) obtaining a list of vulnerabilities introduced by the implementation using the first enumeration and the second enumeration; and (iv) obtaining the third quantification using the list of vulnerabilities and a vulnerability scoring system.

Obtaining the list of vulnerabilities may include removing, from the second enumeration, each of the vulnerabilities listed in the first enumeration, to obtain the list of vulnerabilities.

The final threat model may be further based on at least one scoring system, the scoring system defining how quantifications for first vulnerabilities due to the architecture are calculated.

The final threat model may be further based on the first vulnerabilities due to the architecture and second vulnerabilities due to the implementation.

The first vulnerabilities and the second vulnerabilities may define when the software is acceptable for deployment to the data processing system.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, the system of FIG. 1 may include deployment 100. Deployment 100 may include any number of data processing systems (e.g., 100A-100N). The data processing systems may provide, at least in part, the computer implemented services provided by the system of FIG. 1.

To provide the computer implemented services, the data processing system may host any number of instances of software. For example, the data processing systems may include processors that execute computer instructions specified by the software. The execution of these instructions may cause the data processing systems to perform various operations that contribute to the computer implemented services.

However, the software may present vulnerabilities. The vulnerabilities may permit a malicious entity to perform various undesired activities. For example, the activities may include facilitating remote access to processes performed by the data processing systems; creating, modifying, and/or deleting data managed by the data processing systems. The vulnerabilities may be exploited, for example, using buffer overflows, injections, third-party libraries, exploiting application programming interfaces, and/or via other methods.

If the vulnerabilities are exploited, then the computer implemented services may be compromised. Compromise of data processing systems by a malicious entity may result in undesirable results including loss of data, undesired operation, and/or reduced performance.

In general, embodiments disclosed here relate to systems and methods for automating threat modeling to reduce vulnerabilities in software used in a deployment. The threat modeling may be automated by managing compliance with security standards in the architecture and the implementation of the software. The security standards may be set based on the needs of organization or entity that may design the architecture and the functionality in the implementation of the software. The security standards may be set to, for example, reduce the likelihood of software exhibiting vulnerabilities. The software may present vulnerabilities if the software deviates from the security standards.

To manage the security vulnerabilities, deviations from the security standards may be automatically identified. Based on the deviations, threat models may be constructed. The threat models may be analyzed to determine whether developed software will exhibit a sufficiently low number of vulnerabilities for the software to be acceptable (e.g., within tolerances established by an entity, such as a developer of the software, users of the software, etc.).

Two different threat models may be constructed in the design phase for software and the build phase of for the software, respectively. During the design phase, the first threat model that is developed may be referred to as a design threat model. To develop the design threat model, an analysis of an architecture for the software may be performed. Security deviations from the security standards be identified based on the analysis. The security deviations may be departures of the architecture from the security standards. Thus, if software is implemented using the architecture, the resulting software may present vulnerabilities due to the security deviations. Using the security deviations in the architecture, the design threat model may be constructed. The resulting design threat model may specify the types and quantities of vulnerabilities that are likely to be presented by software developed based on the architecture.

To determine whether the architecture is sufficient for continued development of software, the design security model may be compared to various criteria such as thresholds for the numbers and types of vulnerabilities.

If the design threat model includes a sufficiently small number of vulnerabilities based on the thresholds, then the design threat model may be catalogued in a repository and the architecture may be deemed acceptable for use in implementation of software. Otherwise, if the design threat model includes too many vulnerabilities, the design threat model may not be stored in a repository and a diagnostic report may be generated. In other words, the architecture may not be approved for implementation. The diagnostic report may outline the number and extent of vulnerabilities that make the architecture unacceptable, and suggest modifications to the architecture that may result in a design threat model that includes a sufficiently small number of vulnerabilities such that the architecture may be deemed acceptable for use in implementation of software.

During an implementation stage (e.g., implementation of the architecture by writing code that may be compiled) of the software, a second threat model may also be constructed. This second threat model may be referred to as a build threat model. To develop the build threat model, an analysis of the implementation (i.e., the written code, compiled code, etc.) may be performed. From the analysis, security deviations of the implementation from the security standards may be identified.

The build threat model may be constructed using the security deviations based on the implementation of the architecture. The security deviations may be departures of the implementation of the architecture from the security standards. Thus, if the software based on the architecture is implemented, the software may present some vulnerabilities due to the security deviations of the architecture, and other vulnerabilities due to the security deviations of the implementation. To distinguish vulnerabilities exclusively due to the implementation, the build threat model may be compared to the design threat model for similarities and differences. The differences may reflect the vulnerabilities due to the implementation of the architecture.

Once obtained, the vulnerabilities due to the implementation may be compared to various criteria to ascertain whether the implemented software is acceptable for various uses. For example, various entities (e.g., developers, users, etc.) may provide criteria for software that is acceptable for their use. The criteria may include, for example, threshold regarding numbers and types of vulnerabilities of the software. The comparison may be performed to assess the software for various uses.

If the final threat model includes a sufficiently small number of vulnerabilities (e.g., as defined by the criteria for the implementation), then the final threat model may be deployed to the software and the software may be deemed acceptable for use. Otherwise, if the final threat model includes too many vulnerabilities, then the final threat model may not be deployed for various uses and the software may not be deemed acceptable for use. If not deemed as acceptable, a diagnostic report for the implementation may be generated. The diagnostic report may outline the number and extent of vulnerabilities in the implementation of the architecture that make the implementation unacceptable, and suggest modification to the implementation that may result in a final threat model that includes a sufficiently small number of vulnerabilities such that the implementation may be deemed acceptable and the final threat model may also be deemed to be acceptable.

To provide the above noted functionality, the system may include deployment 100, software development system 105, and communication system 102. Each of these components is discussed below.

Software development system 105 may include any number of data processing systems 105A-105N. Data processing systems 105A-105N may include software development tools for creating architectures, and implementations. For example, the software development tools may include integrated development environments. Additionally, the software development tools may include automation tools for analyzing architectures and implementations, establishment of threat models based on the analysis, and determining whether the architectures and implementations are sufficient for various uses based on the threat models.

Figure 2A:
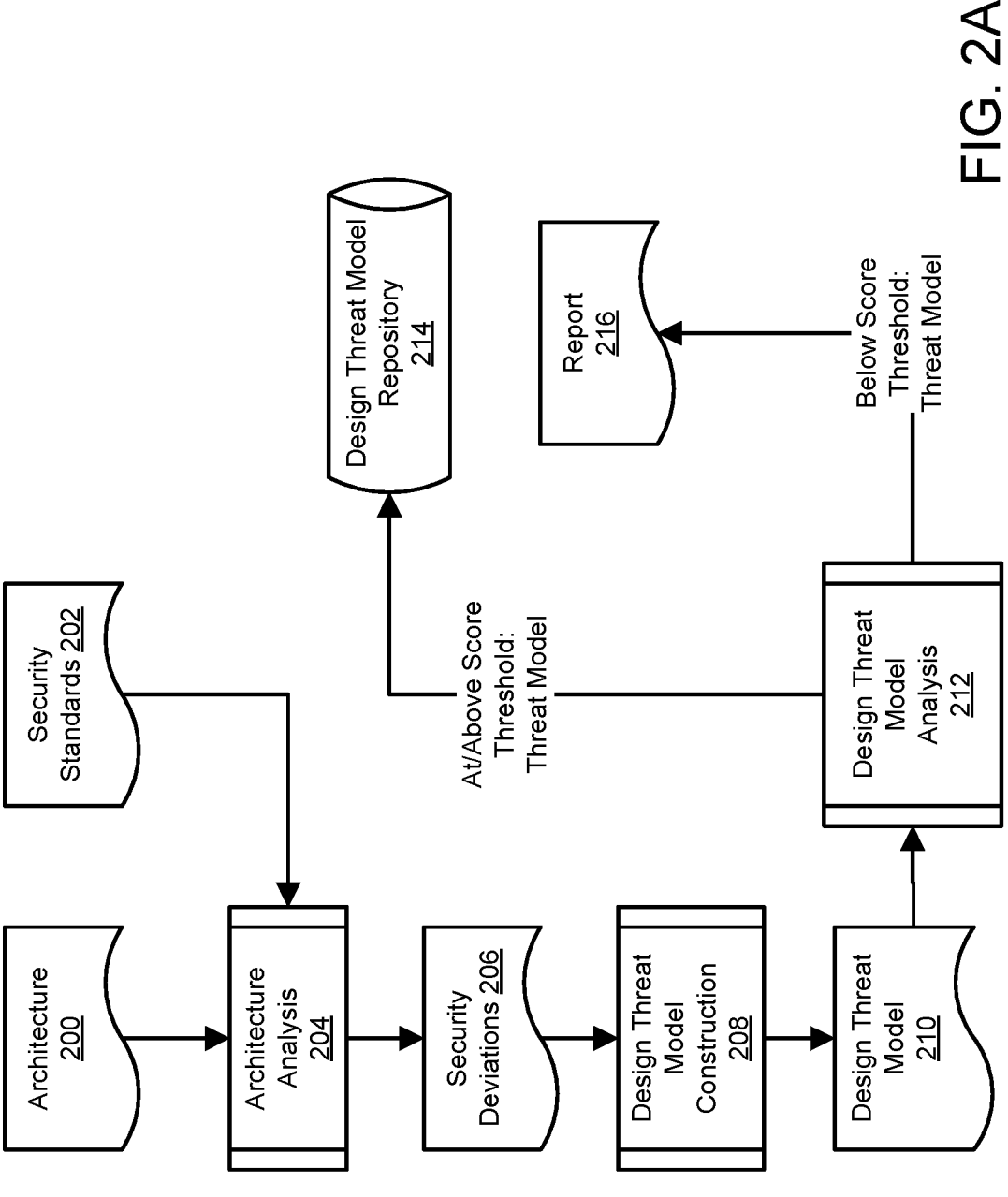
FIG. 2A shows a first data flow diagram illustrating operation of a portion of a system in accordance with an embodiment.
Figure 2B:
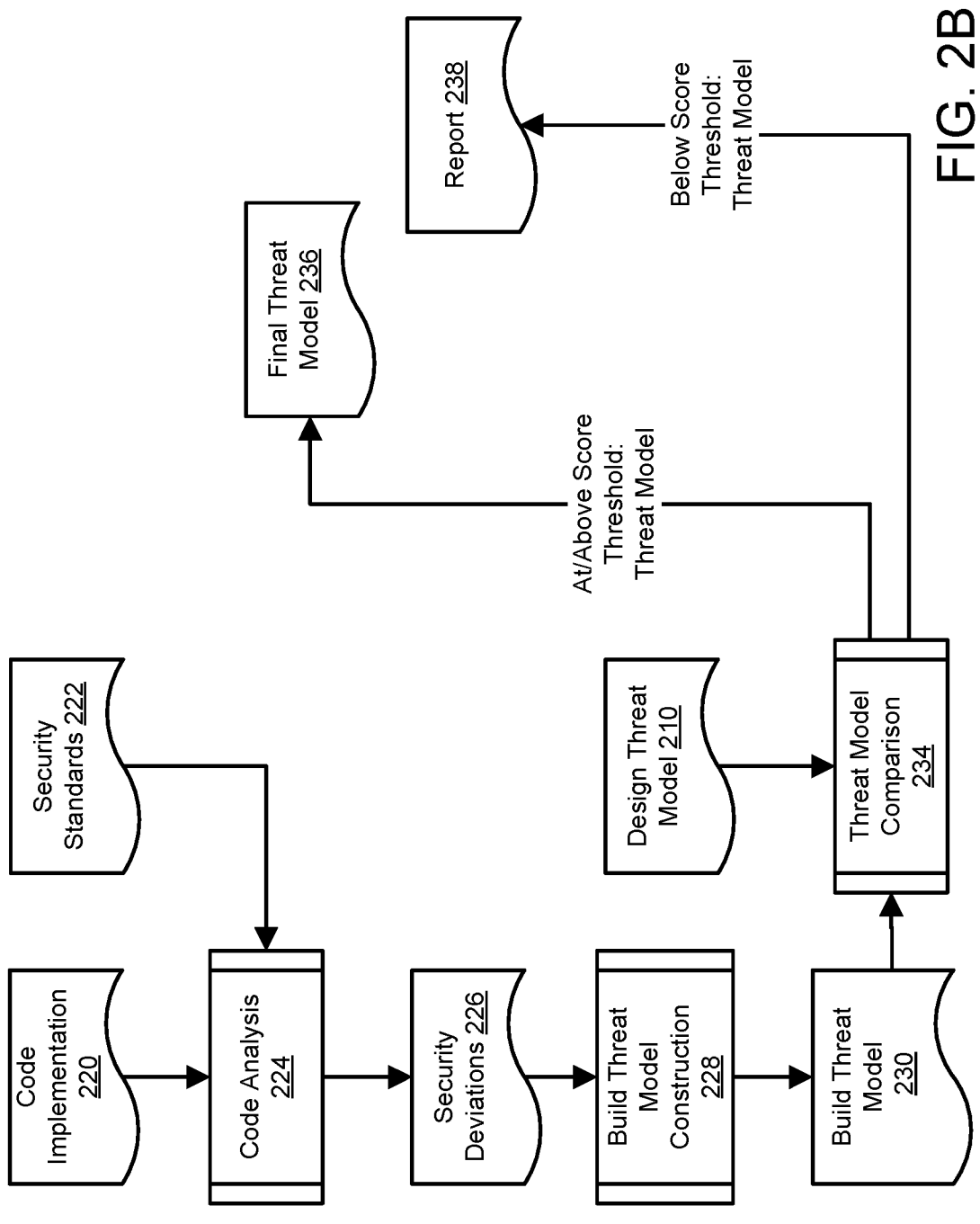
FIG. 2B shows a second data flow diagram illustrating operation of a portion of a system in accordance with an embodiment.

Thus, each of data processing systems 105A-105N may provide computer implemented services including automation of threat modeling for architectures and implementation of software. The threat models may be developed using data processing system 100A-100N. Refer to FIGS. 2A-2B for additional details regarding the construction of the design threat model and the build threat model.

Deployment 100 may include any number of data processing systems 100A-100N. Data processing system 100A-100N may host software generated by software development system 105. Through use of the software, development 100 may provide any number and type of computer implemented services.

Figure 2C:
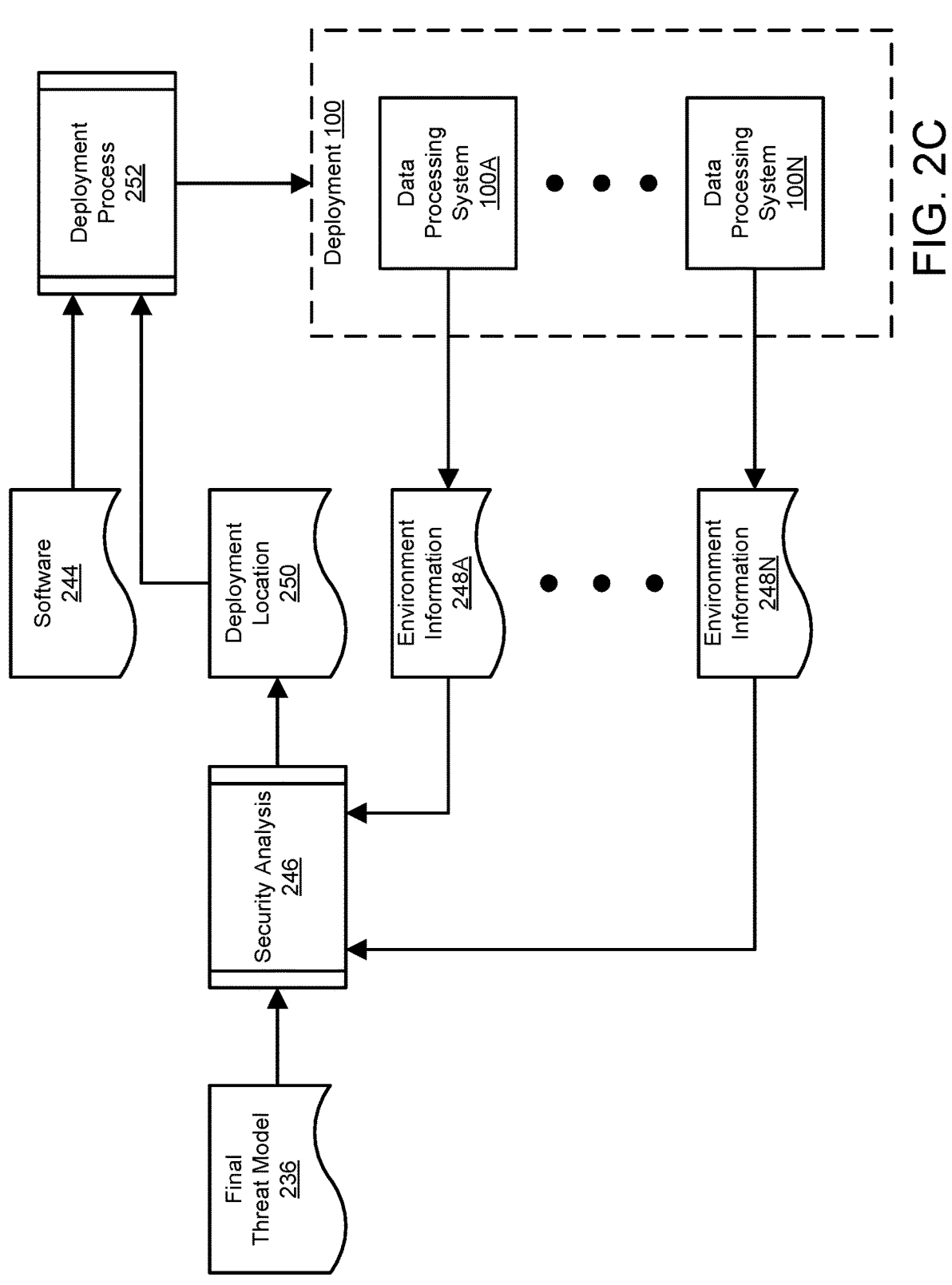
FIG. 2C shows a second data flow diagram illustrating operation of a portion of a system in accordance with an embodiment.

To manage vulnerabilities due to use of the software by deployment 100, software may be restricted from being deployed to deployment 100 based on the environments provided by the data processing systems. For example, vulnerabilities expressed by the software may only be exploitable when certain conditions are met. Software that may exhibit certain types of vulnerabilities that are exploitable due to the environment provided by various data processing systems may be restricted from being deployed to these data processing systems. Refer to FIG. 2C for additional details regarding restricting deployment of software to data processing systems.

When providing their functionalities, software development system 105 and/or deployment 100 (and/or components thereof) may perform all, or a portion, of the data flows and/or methods shown in FIGS. 2A-3C.

Any of (and/or components thereof) software development system 105 and deployment 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While illustrated in FIG. 1 as including a limited number of specific components, a system in accordance with an embodiment may include fewer, additional, and/or different components than those components illustrated therein.

Thus, as shown in FIG. 1, a system in accordance with an embodiment may automate threat modeling for software that may be deployed in an environment within deployment 104.

To further clarify embodiments disclosed herein, data flow diagrams are shown in FIG. 2A-2C. These data flow diagrams show flows of data that may be implemented by the system of FIG. 1. In FIG. 2A, data flows illustrating construction of a design threat model in accordance with an embodiment is shown. In FIG. 2B, data illustrating construction of a build threat model and a final threat model in accordance with an embodiment is shown. In FIG. 2C, data flows illustrating deployment of a threat model with software in accordance with an embodiment is shown.

Turning to FIG. 2A, a first data flow diagram illustrating construction of a design threat model in accordance with an embodiment is shown.

Software development may be generally broken down into two phases: (i) architecting the software, and (ii) implementing the software by writing code that may be compiled to executable binaries based on the architecture. The architecture for the software may be the blueprint, with the written code following the blueprint. Software developed in this manner may exhibit vulnerabilities due to either of these two phases (e.g., due to the architecture, or due to deviations of the implementation from the architecture). To manage such vulnerabilities, the architecture and implementation of the software may be automatically analyzed to identify vulnerabilities introduced during each of these different phases.

To identify and manage vulnerabilities introduced during the architecting phase, an architecture (e.g., 200) for software may be analyzed. The architecture may be developed by a software architect using a development environment.

Once developed, architecture 200 may be analyzed in view of security standards 202 during architecture analysis 204. Security standards 202 may indicate desired features of architecture 200 which may impart resistance to exploitation, tolerance of environmental conditions, resilience to malicious activity or erroneous input by a user, and/or other types of characteristics that limit and/or prevent vulnerabilities from being exhibited by software developed based on the architecture. Security standards 202 may be set by an organization, or another entity, and may specify any number of such features.

Architecture analysis 204 may be performed on architecture 200 to check if security standards 202 have been met. The results of architecture analysis 204 may include an enumerated list of results that qualify if each of security standards 202 have been met by architecture 200. An assessment of the enumerated list of results may be used to gauge the quality of security of the architecture, and to generate a detailed list of vulnerabilities likely to be expressed by software that is developed based on architecture 200. This detailed list may include security deviations 206.

Security deviations 206 may indicate vulnerabilities of architecture 200. These vulnerabilities may be based on features of architecture 200 that do not meet security standards 202. To manage security deviations 206, design threat model construction 208 may be performed.

During design threat model construction 208, design threat model 210 may be constructed using security deviations 206. Design threat model 210 may therefore indicate attributes of environments that may cause vulnerabilities of software that is based on architecture 200 to be exploitable. Thus, for purposes of limiting exploitation of the software, the environment to which the software is deployed may be tailored to reduce the likelihood of the vulnerabilities of the software being exploited. For example, if design threat model 210 indicates that the software will express a vulnerability in the presence of a particular driver, a user of the software may render the vulnerability unexploitable by ensuring that no instances of the driver exist in the environment in which the software is deployed.

Once design threat model 210 is obtained, design threat model analysis 212 may be performed. During design threat model analysis 212, as discussed above, the design threat model may be analyzed to ascertain whether future software based on architecture 200 will likely be sufficiently resilient for various uses. Any uses to which architecture 200 has been qualified (e.g., by design threat model meeting various thresholds for numbers/types of vulnerabilities) may be added to designed threat model repository, and/or other information such as the scores, copies of the design threat model, etc.

If design threat model 210 is scored at or above the threshold (and/or other criteria), then design threat model 210 may be stored in design threat model repository 214. Otherwise, design threat model 210 may not be stored in design threat model repository 214 and report 216 may be generated. Report 216 may indicate, for example, the vulnerabilities that disqualify architecture 200 for various uses, suggestions regarding how architecture 200 could be modified to qualify for the various uses, and/or other types of information usable by a designer of architecture 200 or other person to revise architecture 200 in a manner that is likely to result in the updated architecture qualifying for various uses.

Architecture 200 may be implemented using a data structure. The data structure may account for the overall design and processes of proposed software.

Security standards 202 may be implemented using a data structure. The data structure may include an enumerated list of qualifications. The qualifications may set the expectation of a secure design (e.g., that is sufficiently secure for various purposes) of architecture 200.

Architecture analysis 204 may be implemented using a process. The process may ingest architecture 200 and security standards 202.

Security deviations 206 may be implemented using a data structure.

Design threat model construction 208 may be implemented using a process. The process may ingest security deviations 206. The result of the process may be design threat model 210.

Design threat model 210 may be implemented using a data structure. The data structure may be generated using security deviations 206.

Design threat model analysis 212 may be implemented using a process. The process may include analysis of design threat model 210. The analysis may qualify design threat model to be stored in design threat model repository 214.

Design threat model repository 214 may be implemented using a database. The database may be used store one or more of design threat model 210. The database may be accessed on the implementation of one or more of design threat model 210. Depending on the capability of design threat model 210 to analyze future software of architecture 200, if the criterion for a successful capability is not met, report 216 may be generated concerning design threat model 210.

Report 216 may be implemented using a data structure. The data structure may be generated in response to design threat model analysis 212.

Thus, using the data flow shown in FIG. 2A, embodiments disclosed herein may facilitate construction of a design threat model. As noted above, another threat model may be obtained when an architecture is implemented.

Turning to FIG. 2B, a second data flow diagram illustrating construction of a build threat model and a final threat model in accordance with an embodiment is shown.

As discussed with respect to FIG. 2A, once an architecture is obtained, various bodies of code may be written to attempt to implement the architecture. One or more computer programmers may write code corresponding to various portions of the architecture.

For example, an architecture may define different modules and interactions between the modules. Coders may separately or in teams write code to implement the functionalities of the modules, and interfaces to facilitate interactions between the modules.

However, the written code may deviate from the architecture. Consequently, additional vulnerabilities beyond those specified by the design threat model for the architecture may be introduced. To manage these additional vulnerabilities, an additional threat model may be established, and the two resulting threat models may be used to obtain a final threat model for the implementation of the architecture.

To do so, code implementation 220 may be obtained. Code implementation 220 may be a programmed implementation of architecture 200 from FIG. 2A. Like architecture 220, code implementation 220 may be subject to security standards 222, which may be entirely similar to security standards 202.

To ascertain whether code implementation 220 meets security standards 222, code analysis 224 may be performed. During code analysis, the written code may be analyzed in view of security standards 222. For example, the written code may be syntactically analyzed to ascertain whether the written code complies with security standards 222.

The analysis may be performed, for example, using a large language model adapted to analyze code, using a rules based analysis system, and/or via other processes of automated analysis to identify deviations of code implementation 220 from the security standards specified by security standards 222.

Through code analysis 224 security deviations 224 may be obtained. Like security deviations 206 with respect to architecture 200, security deviations 226 may specify (i) deviations of code implementation 220 from security standards 222, and (ii) conditions that must be met for the identified deviations to be exploitable. In other words, for the deviations to be exploited by a malicious entity, the resulting executable version of code implementation 220 may need to be deployed to an environment meeting certain requirements. The requirement may include one or more of (i) a host operating system, (ii) other software being hosted along with the software, (iii) certain hardware supporting operation of the software, (iv) types of network connectivity, etc.

Using security deviations 226, build threat model construction 228 may be performed to obtain build threat model 230. During build threat model construction 228, security deviations 226 may be used to identify vulnerabilities presented by code implementation 220. The resulting build threat model 230 may specify these vulnerabilities. However, built threat model 230 may specify all vulnerabilities exhibited by code implementation 220, not just those due to the implementation of architecture 200.

To ascertain the vulnerabilities exclusively due to the implementation of architecture 200 (to differentiate from those due to architecture 200), threat model comparison 234 may be performed. During threat model comparison 234, build threat model 230 may be compared to design threat model 210 to identify different vulnerabilities. These different vulnerabilities between the two models may be the vulnerabilities due to deviations in how code implementation 220 was coded relative to architecture 200. These vulnerabilities due to the implementation may be compared to various criteria (e.g., thresholds for numbers and types of vulnerabilities) to ascertain whether code implementation 220 qualifies for various types of uses. The criteria used here may be different from the criteria used to qualify architecture 200.

If the criteria is met, then build threat model 230 may be used as final threat model 236 (e.g., the software as implemented has qualified for various uses. Information regarding these various uses may also be recorded and associated with final threat model 236. Additionally, report 238 may be generated. Report 238 may, like report 216, indicate the uses for which code implementation 220 did not qualify, suggestions for changes that may be made to code implementation 220 that likely will cause the updated code implementation to qualify for the uses, and/or other types of information usable to update code implementation 220 to qualify for various uses.

Code implementation 220 may be implemented using a data structure. The data structure may be a programmed implementation of architecture 200 in FIG. 2A.

Security standards 222 may be implemented using a data structure. The data structure may be similar to security standards 202 in FIG. 2A, but security standards 222 may apply to code implementation 220. Security standards 222 may be used in code analysis 224.

Code analysis 224 may be implemented using a process. The process may ingest code implementation 220 and security standards 222. Code analysis 224 may identify where security standards 222 may not be met by code implementation 220. As a result of code analysis 224, security deviations 226 may be generated.

Security deviations 226 may be implemented using a data structure. The data structure may identify vulnerabilities for code implementation 220 and the conditions that must be met to exploit the vulnerabilities. The vulnerabilities for code implementation 226 may be used in build threat model construction 228.

Build threat model construction 228 may be implemented using a process. The process may use security deviations 226. Through ingesting security deviations 226, build threat model construction 208 may generate build threat model 230, which may account for vulnerabilities and mechanisms for their exploitation in code implementation 220. The result of the process may be build threat model 230.

Build threat model 230 may be implemented using a data structure. The data structure may be generated in build thread model construction 228. Build threat model 230 may specify vulnerabilities from code implementation 220. Build threat model 230 may be compared with design threat model 210 in threat model comparison 234.

Threat model comparison 234 may be implemented using a process. The process may account for similarities and differences in vulnerabilities are assessed between design threat model 210 and build threat model 230. The output of threat model comparison 234 may be final threat model 236.

Final threat model 236 may be implemented using a data structure. The data structure may be constructed using design threat model 210 and build threat model 230. The similarities between design threat model 210 and build threat model 230 may be incorporated in final threat model 236. The differences between design threat model 210 and build threat model 230 may be considered as originating between architecture 200 and code implementation 220 and may be addressed for incorporation into final threat model 236.

Report 238 may be implemented using a data structure. The data structure may be generated in response to final threat model analysis 236. Report 238 may list suggestions on how to respond to security vulnerabilities and their pathways for exploitation.

Thus, using the flow shown in FIG. 2B, embodiments disclosed herein may facilitate construction of a build threat model, a final threat model, and qualification of software for various uses.

Turning to FIG. 2C, a third data flow diagram illustrating deployment of software in accordance with an embodiment is shown.

As discussed above, when software 244 is implemented (e.g., by compiling code implementation 220 into an executable form), final threat model 236 may be established. Final threat model 236 may specify the vulnerabilities (e.g., due to architecture and implementation) that will be presented by software 244 when certain environmental conditions are present.

To manage these vulnerabilities, security analysis 246 may be performed prior to deployment of software 244 to deployment 100. During security analysis 246, information regarding environments in which software 244 may be deployed to deployment 100 may be obtained. For example, environment information 248A-248N may be obtained from data processing systems 100A-100N. The obtained environment information may indicate characteristics (e.g., operating systems, drivers, other software, hardware components, configurations, etc.) of the software environments to which software 244 may be exposed if deployed to one of data processing systems 100A-100N.

Environment information 248A-248N may be used to identify the vulnerabilities of software 244 that may be exploitable if software 244 is deployed to one of these data processing systems. During security analysis 246, the vulnerabilities that will be exploitable in each environment may be analyzed to select one or more of data processing systems 100A-100N as deployment location 250.

To make the selection, security analysis 246 may apply a set of rules, may use an optimization function, and/or may otherwise use the exploitable vulnerabilities to select locations to which software 244 is to be deployed.

For example, a certain number of instances of software 244 may need to be deployed to meet various goals (e.g., workload balancing). The vulnerabilities that will be exploitable (or not exploitable) if deployed to data processing systems 100A-100N may be used as a basis for selecting a corresponding number of deployment locations for the instances of software 244.

Once deployment location 250 is obtained, deployment process 252 may be performed. During deployment process 252, instances of software 244 may be deployed to one or more locations (e.g., data processing systems) specified by deployment location 250.

Software 244 may be implemented using a data structure. The data structure may be an executable program derived from a coded implementation of a software architecture. Software 244 may be implemented with final threat model 236 to account for vulnerabilities which may be exploited in environment 248. In preparation for execution in environment 248, security analysis 246 may be performed.

Security analysis 246 may be implemented using a process. The process may implement final threat model 236 and environment information 248A to recommend deployment location 250.

Environment information 248A-248N may be implemented using a data structure. The data structure may include details of the environment of data processing system 100A-100N. Environment information 248A-248N may be sent from of data processing system 100A-100N or extracted by security analysis 246. Environment information 248A-248N may be used in security analysis 246 to identify vulnerabilities that may be exploitable.

Deployment location 250 may be implemented using a data structure. The data structure may be generated by security analysis 246. Deployment location 250 may be include one or more selections of environments in which security analysis 246 may recommend deploying software 244.

Deployment process 252 may be implemented using a process. The process may include the deployment of software 244 to one or more environments of deployment 100 specified by deployment location 250.

Thus, using the flow shown in FIG. 2C, embodiments disclosed herein may illustrate deployment of a final threat model with software. The final threat model may account for environmental vulnerabilities and dependencies of the software on deployment to an environment.

Figure 3A:
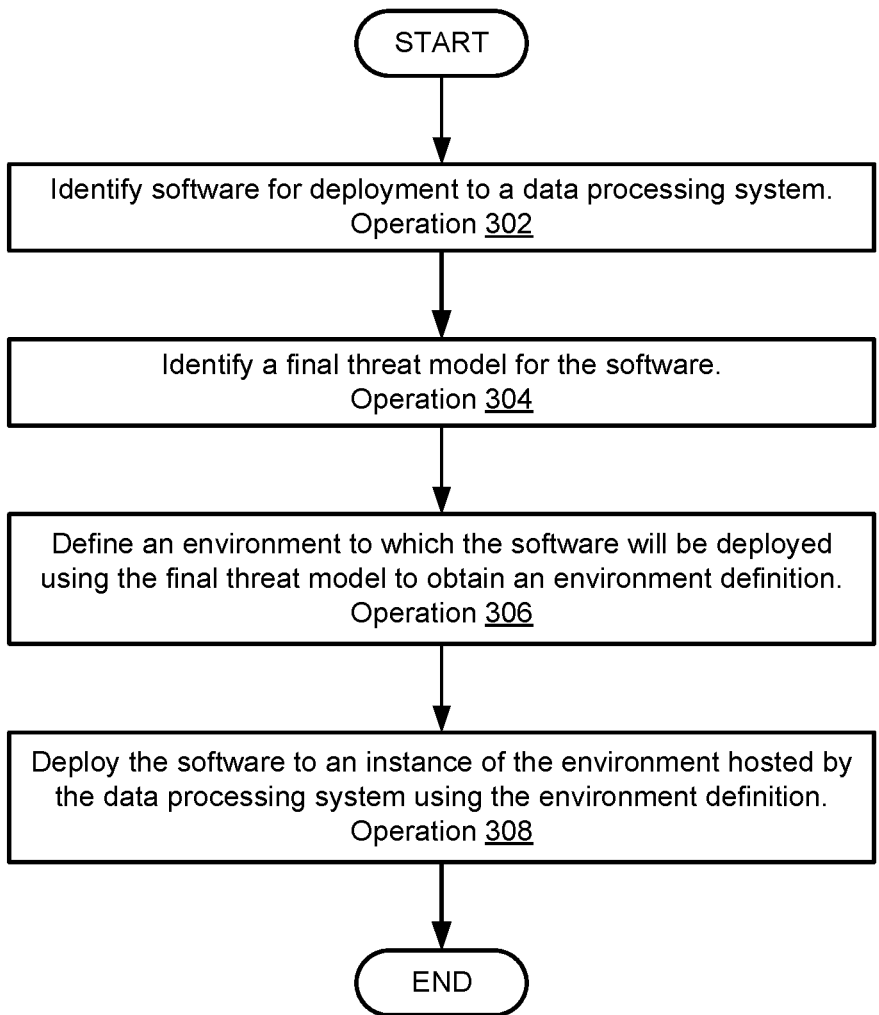
FIG. 3A shows a flow diagram illustrating a method of deploying a software with a final threat model to an environment in accordance with an embodiment.
Figure 3B:
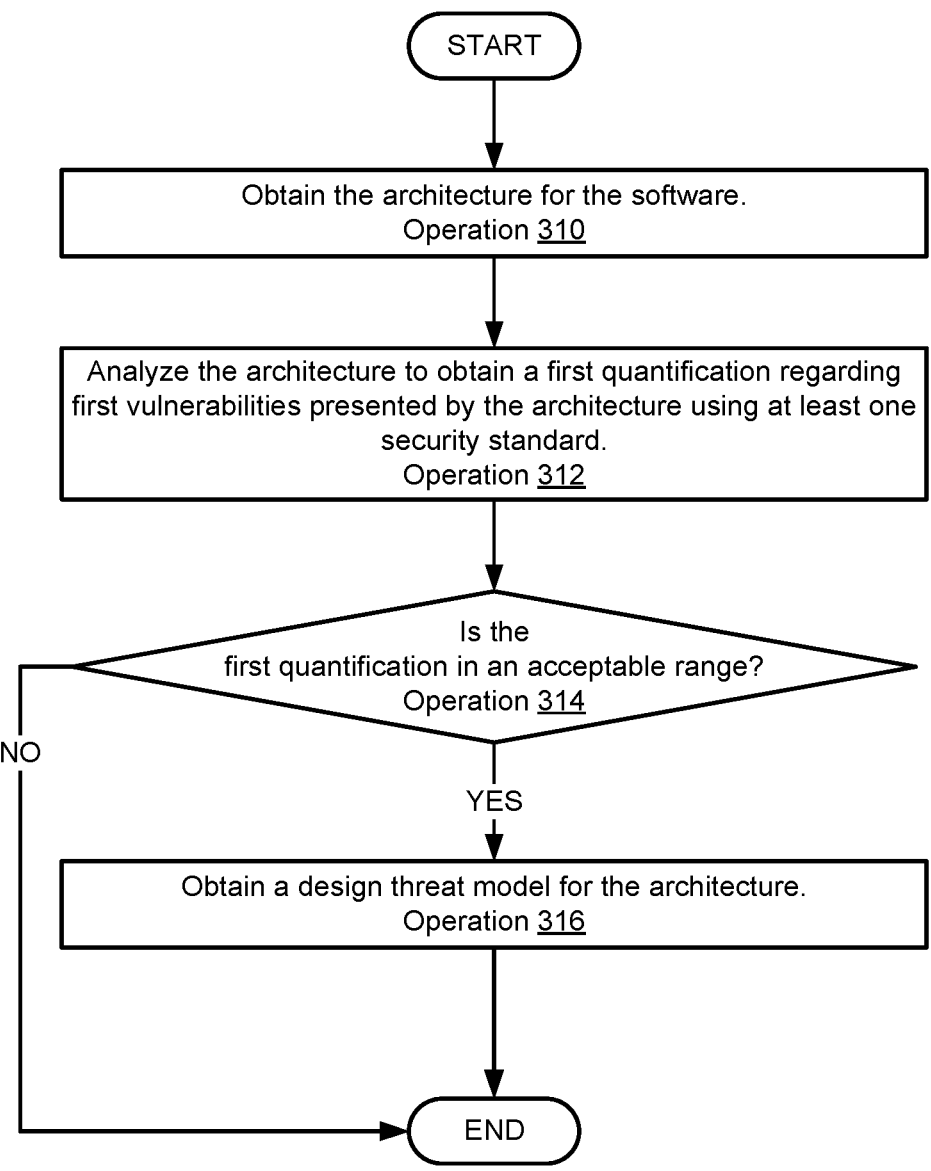
FIG. 3B shows a flow diagram illustrating a method of obtaining a design threat model for a software architecture in accordance with an environment.
Figure 3C:
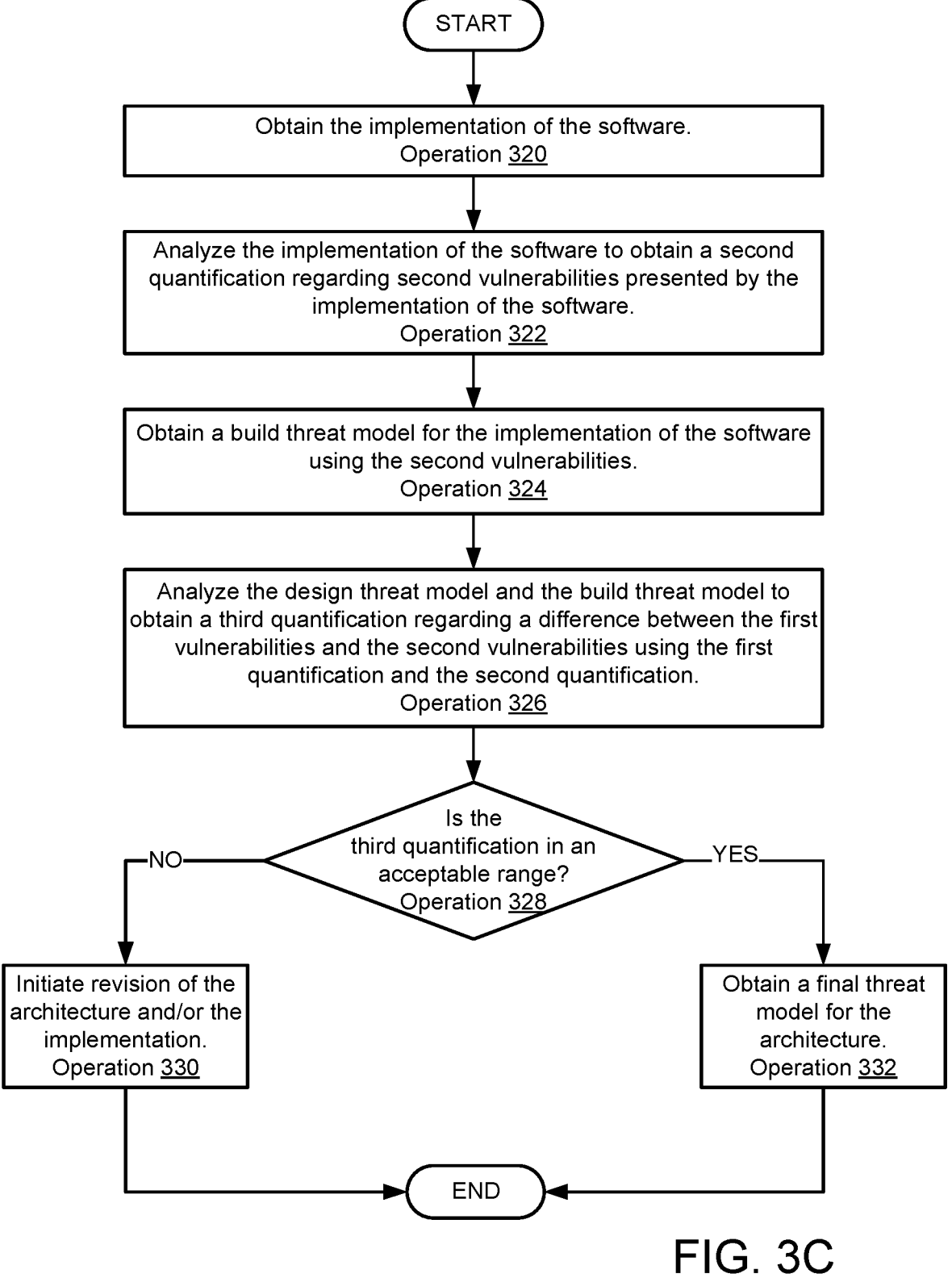
FIG. 3C shows a flow diagram illustrating a method of developing a final threat model from a design threat model and a build threat model in accordance with an embodiment.

As discussed above, the components of FIG. 1 may perform various methods to manage operations on software development system 105 and deployment 100. FIGS. 3A-3C illustrate methods that may be performed by the components of FIG. 1. In the diagrams discussed below and shown in FIGS. 3A-3C, any of the operations may be repeated, performed in different orders, and/or performed in parallel with and/or in a partially overlapping in time manner with other operations.

Turning to FIG. 3A, a first flow diagram illustrating a method of deploying a final threat model to a deployment in accordance with an embodiment is shown. The method may be performed, for example, by any of the components of the system of FIG. 1, and/or other components not shown therein.

At operation 302, software may be identified for deployment to a data processing system. The software may be identified for deployment by (i) selecting the software to deploy to a data processing system, (ii) by receiving instructions (e.g., from an administrator or other person) to deploy the software to any data processing system, and/or via other methods.

At operation 304, a final threat model may be identified for the software. The final threat model may be identified by using an association between the final threat model and the software. For example, when software is qualified for deployment, a final threat model for the software may be associated with the software (e.g., using metadata, a lookup table, etc.). The association may be used to identify the final threat model by performing a lookup, reading the metadata, etc.

At operation 306, an environment to which the software will be deployed may be defined using the final threat model to obtain an environment definition. The environment may be defined by analyzing the conditions precedent for the vulnerabilities specified by the final threat model to be exploitable. The environment may be defined so that the conditions precedent (all or a portion) are not part of the defined environment. Thus, if deployed to the defined environment, the vulnerabilities of the software (all or a portion) may not be exploitable.

At operation 308, the software may be deployed to an instance of the environment hosted by the data processing system using the environment definition. The software may be deployed by (i) identifying an instance of the environment hosted by a data processing system, and (ii) installing a copy of the software in the identified data processing system. The data processing system may be identified by collecting environment information from any number of data processing systems, and comparing the environment information to the environment definition (e.g., to identify a match between the environment definition and environment information for one of the data processing systems, or a best match should no perfect matches be available).

The method may end following operation 308.

As discussed with respect to FIG. 3A, a final threat model for software may be used to determine where to deploy software. As discussed with respect to FIGS. 2A-2B, a design threat model and a build threat model may be used to obtain a final threat model. FIGS. 3B-3C below provide additional information regarding how these threat models are obtained as used.

Turning to FIG. 3B, a flow diagram illustrating a method of obtaining a design threat model in software development system 100 in accordance with an embodiment is shown. The method may be performed by one or more of data processing system 100A-100N in software development system 100.

At operation 310, the architecture for the software may be obtained. The architecture may be obtained by (i) reading the architecture from storage, (ii) obtaining user input that defines the architecture, (iii) receiving the architecture from another device, and/or via other methods.

At operation 312, the architecture may be analyzed to obtain a first quantification regarding first vulnerabilities presented by the architecture using at least one security standard. The architecture may be analyzed by processing all modules, all interfaces between the modules, and scoring them according to security standards.

At operation 314, a determination may be made regarding whether the first quantification is in an acceptable range. The determination may be made by comparing the first quantification to the acceptable range. For example, the acceptable range may be defined by a threshold value. The threshold may be compared to the first quantification to determine whether the first quantification is within the acceptable range.

If the first quantification is within the acceptable range, then the method may proceed to operation 318. If the first quantification is not within the acceptable range, then the method may end following operation 314.

At operation 316, a design threat model may be obtained for the architecture. The design threat model may be obtained by (i) identifying a first deviation of the architecture from at least one security standard; (ii) identifying at least one vulnerability associated with the first deviation; and (iii) adding the at least one vulnerability associated with the first deviation to the design threat model. The first deviation of the architecture may be identified by identifying an inability of the architecture to satisfy the at least one security standard. The at least one vulnerability may be identified by identifying how the first deviation may undermine the at least one security standard in the architecture. The at least one vulnerability may be added to the design threat model by incorporating the attributes of the first deviation that undermines the at least one security standard to the design threat model.

The method may end following operation 316.

Turning to FIG. 3C, a flow diagram illustrating a method of obtaining a final threat model from the design threat model and a build threat model in accordance with an embodiment is shown. The method may be performed by any of the components of FIG. 1.

At operation 320, the implementation of the software for the software may be obtained. The implementation may be obtained by (i) reading the implementation from storage, (ii) obtaining user input that defines the implementation, (iii) receiving the implementation from another device, and/or via other methods.

At operation 322, the implementation of the software may be analyzed to obtain a second quantification regarding second vulnerabilities presented by the implementation of the software. The implementation of the software may be analyzed by identifying at least one security deviation of the implementation from at least one security standards that undermines the at least one security standard in the implementation of the code. The at least one security deviation may be used to identify the second vulnerabilities.

At operation 324, a build threat model may be obtained for the implementation of the software using the second vulnerabilities. The build threat model may be obtained by (i) identifying a second deviation of the implementation from the at least one security standard (e.g., the same applied in operation 316); (ii) identifying at least one vulnerability associated with the second deviation; and (iii) adding the at least one vulnerability associated with the second deviation to the build threat model. The second deviation of the implementation may be identified by identifying the at least one security standard that may be undermined by the implementation. The at least one vulnerability may be identified by identifying how the second deviation may undermine the at least one security standard in the implementation. The at least one vulnerability may be added to the build threat model by incorporating the attributes of the second deviation that undermines the at least one security standard to the build threat model.

At operation 326, the design threat model and the build threat model may be analyzed to obtain a third quantification regarding a difference between the first vulnerabilities and the second vulnerabilities using the first quantification and the second quantification. The design threat model and the build threat model may be analyzed by (i) enumerating the first vulnerabilities specified by the design threat model to obtain a first enumeration of vulnerabilities; (ii) enumerating the second vulnerabilities specified by the implementation threat model to obtain a second enumeration of the vulnerabilities; (iii) obtaining a list of vulnerabilities introduced by the implementation using the first enumeration and the second enumeration; and (iv) obtaining the third quantification using the list of vulnerabilities and a vulnerability scoring system.

The first vulnerabilities specified by the design threat model may be enumerated by listing all the first vulnerabilities from the design threat model. The second vulnerabilities specified by the build threat model may be enumerated by listing all the second vulnerabilities from the build threat model. A list of vulnerabilities introduced by the implementation using the first enumeration and the second enumeration may be obtained by removing, from the second enumeration, each of the vulnerabilities listed in the first enumeration, to obtain the list of vulnerabilities. Each of the vulnerabilities listed in the first enumeration may be removed from the second enumeration by removing vulnerabilities from the first enumeration that may be present in the second enumeration.

At operation 328, a determination may be made regarding whether the third quantification is in a third acceptable range. The determination may be made similarly to as discussed with respect to operation 314. However, the threshold used in operation 328 may be different from the threshold used in operation 314. Thus, through use of these different thresholds, the types of vulnerabilities due to different causes (e.g., design versus implementation) may be separately managed.

If the third quantification is in the third acceptable range, then the method may proceed to operation 332. If the third quantification is not in the third acceptable range, then the method may end following operation 330.

At operation 330, revision of the architecture and/or the implementation may be initiated. The revision of the architecture and/or the implementation may be initiated by (i) sending communications to developers responsible for the architecture and/or implementation, (ii) scheduling the revisions using a scheduling system, (iii) storing information regarding the revisions, and/or via other methods. Once initiated, the developers (e.g., system architects, coders, etc.) may revise the architecture and/or the implementation. For example, the developers may use the reports and/or other data structures generated when the architecture and/or implementation do not meet security standards, as discussed with respect to FIGS. 2A-2C.

The method may end following operation 330.

Returning to operation 328, the method may proceed to operation 332 if the third quantification is in the acceptable range. In other words, the vulnerabilities introduced by the implementation of an architecture may be sufficiently low for one or more uses of resulting software.

At operation 332, the final threat model may be obtained using the design threat model and the build threat model. The final threat model may be obtained by promoting the build threat model to be the final threat model.

The method may end at operation 332.

Thus, using the methods shown in FIGS. 3A-3C, embodiments disclosed herein may facilitate deployment of software that is likely to express numbers and types of vulnerabilities that are within acceptable ranges that may be customized based on a level of tolerance for vulnerabilities.

Figure 4:
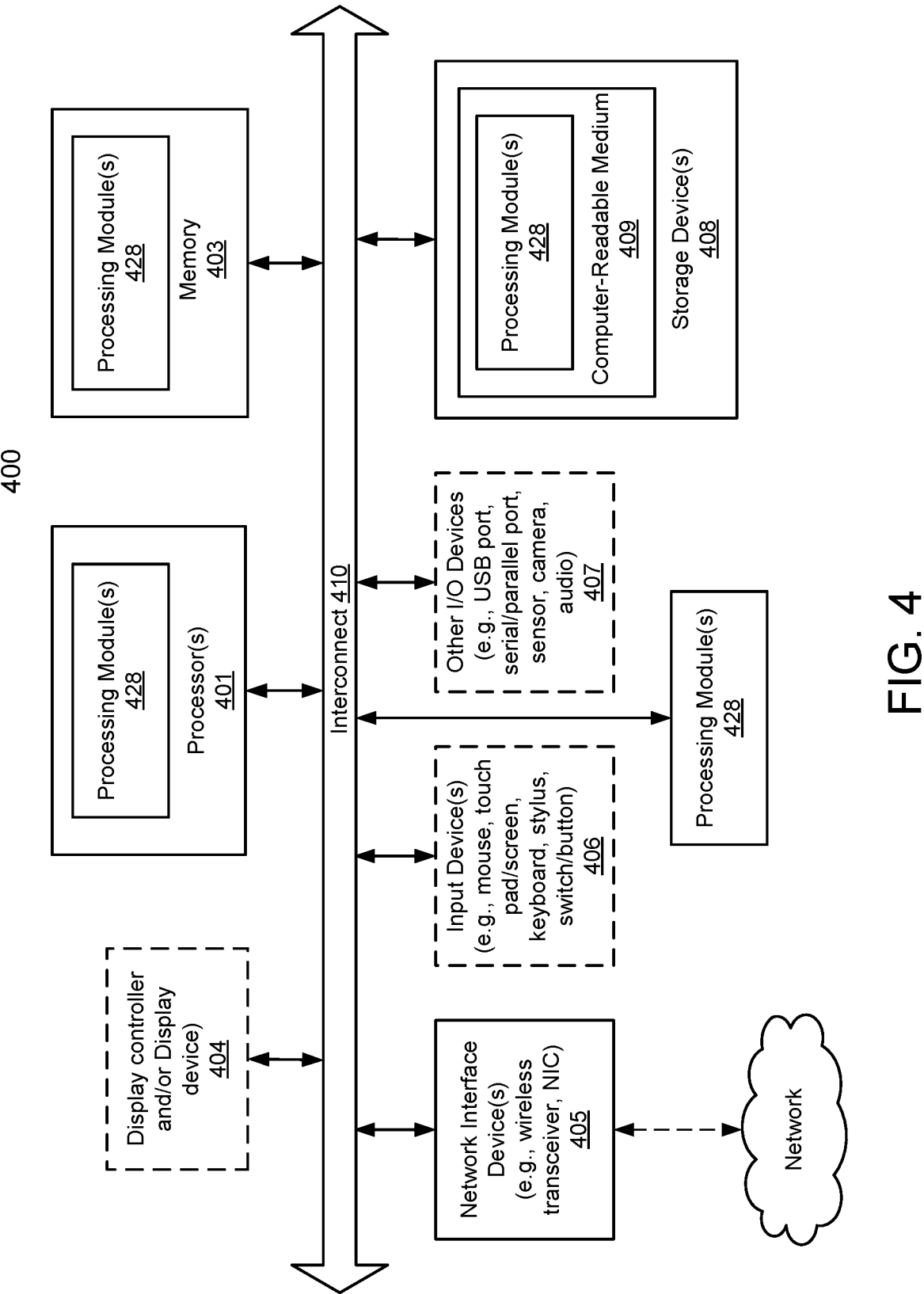
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an acceler-ometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable stor-age medium 409 (also known as a machine-readable storage medium or a computer-readable medium) on which is stored one or more sets of instructions or software (e.g., processing module, unit, and/or processing module/unit/logic 428) embodying any one or more of the methodologies or func-tions described herein. Processing module/unit/logic 428 may represent any of the components described above. Processing module/unit/logic 428 may also reside, com-pletely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above per-sistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memo-ries, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of inter-connecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic repre-sentations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requir-ing physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic com-puting device, that manipulates and transforms data repre-sented as physical (electronic) quantities within the com-puter system's registers and memories into other data similarly represented as physical quantities within the com-puter system memories or registers or other such informa-tion storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the opera-tions described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for securing software architectures, the method comprising:

obtaining an architecture for a software;

analyzing the architecture to obtain a first quantification regarding first vulnerabilities presented by the architecture using at least one security standard;

obtaining a design threat model for the architecture using the first vulnerabilities;

obtaining an implementation of the software;

analyzing the implementation of the software to obtain a second quantification regarding second vulnerabilities presented by the implementation of the software;

obtaining a build threat model for the implementation of the software using the second vulnerabilities;

identify the software for deployment to a data processing system;

based on the identifying of the software:

identifying a final threat model for the software, the final threat model being based on the design threat model for the architecture for the software and on the build threat model for the implementation of the software;

defining an environment to which the software will be deployed using the final threat model to obtain an environment definition; and deploying the software to an instance of the environment hosted by the data processing system using the environment definition.

2. The method of claim 1, further comprising:

prior to identifying the software for the deployment to the data processing system, and after obtaining the design threat model:

analyzing the design threat model and the build threat model to obtain a third quantification regarding a difference between the first vulnerabilities and the second vulnerabilities using the first quantification and the second quantification;

in a first instance of the analyzing of the design threat model and the build threat model where the third quantification is in a third acceptable range:

obtaining the final threat model using the design threat model and the build thread threat model; and in a second instance of the analyzing of the design threat model and the build threat model where the third quantification is outside of the third acceptable range:

initiating revision of the architecture and/or the implementation.

3. The method of claim 2, wherein obtaining the design threat model for the architecture comprises:

identifying a first deviation of the architecture from the at least one security standard;

identifying at least one vulnerability associated with the first deviation; and adding the at least one vulnerability associated with the first deviation to the design threat model.

4. The method of claim 3, wherein obtaining the build threat model for the implementation of the software comprises:

identifying a second deviation of the implementation from the at least one security standard;

identifying at least one vulnerability associated with the second deviation; and adding the at least one vulnerability associated with the second deviation to the build threat model.

5. The method of claim 4, wherein analyzing the design threat model and the build threat model to obtain the third quantification regarding the difference between the first vulnerabilities and the second vulnerabilities comprises:

enumerating the first vulnerabilities specified by the design threat model to obtain a first enumeration of vulnerabilities;

enumerating the second vulnerabilities specified by the build threat model to obtain a second enumeration of vulnerabilities;

obtaining a list of vulnerabilities introduced by the implementation using the first enumeration and the second enumeration; and obtaining the third quantification using the list of vulnerabilities and a vulnerability scoring system.

6. The method of claim 5, wherein obtaining the list of vulnerabilities comprises:

removing, from the second enumeration, each of the vulnerabilities listed in the first enumeration, to obtain the list of vulnerabilities.

7. The method of claim 1, wherein the final threat model is further based on at least one scoring system, the scoring system defining how quantifications for the first vulnerabilities due to the architecture are calculated.

8. The method of claim 7, wherein the final threat model is further based on the first vulnerabilities due to the architecture and the second vulnerabilities due to the implementation.

9. The method of claim 8, wherein the first vulnerabilities and the second vulnerabilities define when the software is acceptable for deployment to the data processing system.

10. A non-transitory machine-readable medium having instructions stored therein, which when executed by a processor, cause the processor to perform operations for securing software architectures, the operations comprising:

obtaining an architecture for a software;

analyzing the architecture to obtain a first quantification regarding first vulnerabilities presented by the architecture using at least one security standard;

obtaining a design threat model for the architecture using the first vulnerabilities;

obtaining an implementation of the software;

analyzing the implementation of the software to obtain a second quantification regarding second vulnerabilities presented by the implementation of the software;

obtaining a build threat model for the implementation of the software using the second vulnerabilities;

identify the software for deployment to a data processing system;

based on the identifying of the software:

identifying a final threat model for the software, the final threat model being based on the design threat model for the architecture for the software and on the build threat model for the implementation of the software;

defining an environment to which the software will be deployed using the final threat model to obtain an environment definition; and deploying the software to an instance of the environment hosted by the data processing system using the environment definition.

11. The non-transitory machine-readable medium of claim 10, further comprising:

prior to identifying the software for the deployment to the data processing system, and after obtaining the design threat model:

analyzing the design threat model and the build threat model to obtain a third quantification regarding a difference between the first vulnerabilities and the second vulnerabilities using the first quantification and the second quantification;

in a first instance of the analyzing of the design threat model and the build threat model where the third quantification is in a third acceptable range:

obtaining the final threat model using the design threat model and the build threat model; and in a second instance of the analyzing of the design threat model and the build threat model where the third quantification is outside of the third acceptable range:

initiating revision of the architecture and/or the implementation.

12. The non-transitory machine-readable medium of claim 11, wherein obtaining the design threat model for the architecture comprises:

identifying a first deviation of the architecture from the at least one security standard;

identifying at least one vulnerability associated with the first deviation; and adding the at least one vulnerability associated with the first deviation to the design threat model.

13. The non-transitory machine-readable medium of claim 12, wherein obtaining the build threat model for the implementation of the software comprises:

identifying a second deviation of the implementation from the at least one security standard;

identifying at least one vulnerability associated with the second deviation; and adding the at least one vulnerability associated with the second deviation to the build threat model.

14. The non-transitory machine-readable medium of claim 10, wherein the final threat model is further based on at least one scoring system, the scoring system defining how quantifications for first vulnerabilities due to the architecture are calculated.

15. The non-transitory machine-readable medium of claim 14, wherein the final threat model is further based on the first vulnerabilities due to the architecture and the second vulnerabilities due to the implementation.

16. A data processing system, comprising:

a processor; and a memory coupled to the processor to store instructions, which when executed by the processor, cause the processor to perform operations securing software architectures, the operations comprising:

obtaining an architecture for a software;

analyzing the architecture to obtain a first quantification regarding first vulnerabilities presented by the architecture using at least one security standard;

obtaining a design threat model for the architecture using the first vulnerabilities;

obtaining an implementation of the software;

analyzing the implementation of the software to obtain a second quantification regarding second vulnerabilities presented by the implementation of the software;

obtaining a build threat model for the implementation of the software using the second vulnerabilities;

identify the software for deployment to the data processing system;

based on the identifying of the software:

identifying a final threat model for the software, the final threat model being based on the design threat model for the architecture for the software and on the build threat model for the implementation of the software;

defining an environment to which the software will be deployed using the final threat model to obtain an environment definition; and deploying the software to an instance of the environment hosted by the data processing system using the environment definition.

17. The data processing system of claim 16, further comprising:

prior to identifying the software for the deployment to the data processing system, and after obtaining the design threat model:

analyzing the design threat model and the build threat model to obtain a third quantification regarding a difference between the first vulnerabilities and the second vulnerabilities using the first quantification and the second quantification;

in a first instance of the analyzing of the design threat model and the build threat model where the third quantification is in a third acceptable range:

obtaining the final threat model using the design threat model and the build threat model; and in a second instance of the analyzing of the design threat model and the build threat model where the third quantification is outside of the third acceptable range:

initiating revision of the architecture and/or the implementation.

18. The data processing system of claim 17, wherein obtaining the design threat model for the architecture comprises:

identifying a first deviation of the architecture from the at least one security standard;

identifying at least one vulnerability associated with the first deviation; and adding the at least one vulnerability associated with the first deviation to the design threat model.

19. The data processing system of claim 18, wherein obtaining the build threat model for the implementation of the software comprises:

identifying a second deviation of the implementation from the at least one security standard;

identifying at least one vulnerability associated with the second deviation; and adding the at least one vulnerability associated with the second deviation to the build threat model.

20. The data processing system of claim 16, wherein the final threat model is further based on at least one scoring system, the scoring system defining how quantifications for first vulnerabilities due to the architecture are calculated.

* * * * *